(12) United States Patent
Burdon et al.

(10) Patent No.: US 6,648,999 B2
(45) Date of Patent: Nov. 18, 2003

(54) LOW PRESSURE LAMINATED CERAMIC DEVICES AND METHOD

(75) Inventors: Jeremy W. Burdon, Scottsdale, AZ (US); Rong Fong Huang, Fremont, CA (US)

(73) Assignee: Motorola, Inc., Schaumburg, IL (US)

(*) Notice: Subject to any disclaimer, the term of this patent is extended or adjusted under 35 U.S.C. 154(b) by 219 days.

(21) Appl. No.: 09/940,291

(22) Filed: Aug. 27, 2001

(65) Prior Publication Data

US 2003/0037857 A1 Feb. 27, 2003

(51) Int. Cl.[7] .................................................. H01G 4/00
(52) U.S. Cl. ............................... 156/89.12; 156/308.2; 427/96
(58) Field of Search .................... 156/89.11, 89.12, 156/308.2; 427/96; 29/851; 361/320, 321.2

(56) References Cited

U.S. PATENT DOCUMENTS 5,261,986 A * 11/1993 Kawabata et al. .......... 156/235
5,958,165 A * 9/1999 Takeuchi et al. ........... 156/89.11
6,592,696 B1 * 7/2003 Burdon et al. ............. 156/89.12
2003/0039841 A1 * 2/2003 Miesem et al. ............. 428/432

* cited by examiner

Primary Examiner—Michael W. Ball
Assistant Examiner—John T. Haran
(74) Attorney, Agent, or Firm—William E. Koch

(57) ABSTRACT

An intermediate low-pressure laminated ceramic device is formed from a plurality of layers of unfired ceramic material each including ceramic particles in an organic binder. A polymer interfacial layer having a glass transition temperature such that it flows at a temperature below a temperature required for the unfired ceramic layers to substantially deform, is deposited on one surface of each of the unfired ceramic layers. The unfired ceramic layers are stacked with an interfacial layer positioned between adjacent unfired ceramic layers in the stack. The stack is heated to a temperature greater than the glass transition temperature of the interfacial layers and a pressure is applied to the heated stack below approximately 1200 psi to fixedly bond the plurality of layers in the stack together.

24 Claims, 3 Drawing Sheets

LOW PRESSURE LAMINATED CERAMIC DEVICES AND METHOD

FIELD OF THE INVENTION

This invention relates to laminated ceramic devices and more particularly to methods of laminating the ceramic devices.

BACKGROUND OF THE INVENTION

At the present time, and especially in the RF field, many electronic components are formed on or in ceramic modules. In the process of forming the ceramic modules, thin sheets of unfired or "green" ceramic material are provided which, as is known in the art, usually includes $Al_2O_3$ particles, glass particles, and a binder, generally including organic material. Each sheet generally includes a plurality of module layers formed adjacent each other so as to share sides. Each module layer on the sheet generally includes some electrical traces and may further include some electrical components such as capacitors, inductors, resistors, etc. Each module layer also includes vias extending therethrough. Components and electrical traces may be formed on the sheets by screening (or the like) silver paint or other conductive material.

A plurality of the sheets (sometimes as many as fifty) are stacked or positioned in overlying relationship and vertically aligned to form common module sides through the entire stack. It will of course be understood that internal vias and various other connections are also aligned during this process to provide one or more complete interconnected circuits in each of the modules.

After the stacking and alignment of the sheets is accomplished, the stack is pressed under a uniaxial pressure at an elevated temperature to produce bonding between adjacent sheets. Generally, the temperature is elevated to approximately 70° C. and a pressure of approximately 5000 pounds-per-square-inch (psi) is applied. As understood by those skilled in the art, the pressure and temperature must be sufficient to produce some bonding between the binders of adjacent sheets. If adequate binding does not occur, the sheets may be inadvertently separated during subsequent handling, resulting in destruction of the entire assembly.

Once the stack of unfired or green ceramic sheets has been assembled and the individual sheets bonded together, the stack is cut or otherwise divided into individual modules. Generally, for example, the stack is cut with a very sharp instrument. The cutting is easily accomplished since the sheets are still formed of unfired or green ceramic. Again, if the stack is not adequately bonded, the sheets may be inadvertently separated during the cutting operation.

One major problem that occurs with this prior art process of forming ceramic modules is the amount of pressure that must be applied to achieve adequate bonding of the unfired ceramic sheets. Internal cavities and channels cannot be incorporated, for example, because this high pressure causes deformations in this type of feature. Also, this prior process is slow and cannot be easily implemented within an automated production line (i.e. the automated multilayer manufacturing stages are separated by the high-pressure lamination process which is inherently a high labor technology).

Accordingly it is highly desirable to provide new and improved methods of forming intermediate low-pressure laminated ceramic devices and new laminated ceramic devices that can easily be formed with internal cavities and channels.

BRIEF DESCRIPTION OF THE DRAWINGS

Referring to the drawings.

DESCRIPTION OF THE PREFERRED EMBODIMENTS

Figure 1:
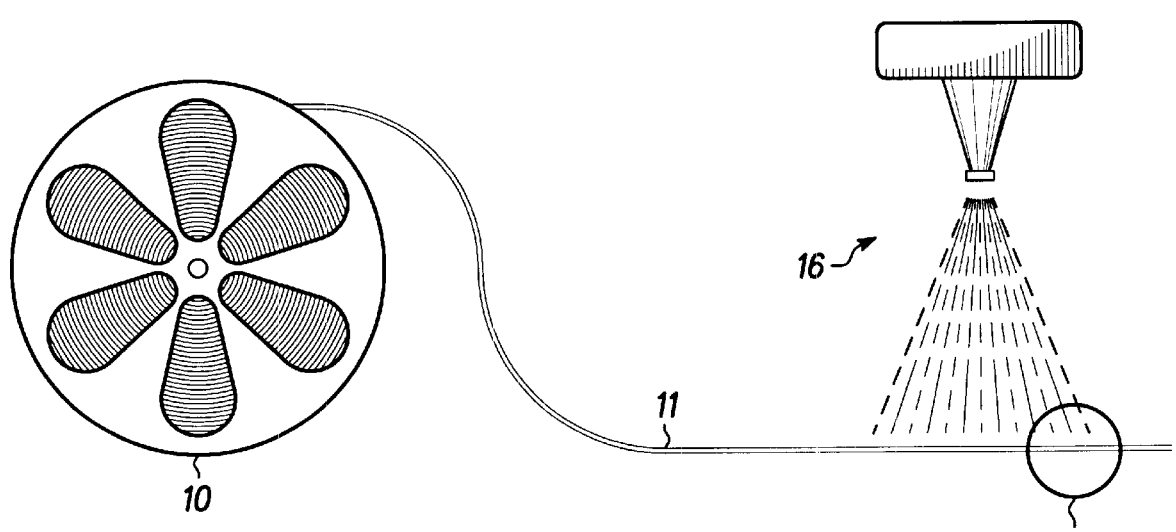
FIG. 1 is a simplified view of some steps in an assembly process in accordance with the present invention.

The present invention pertains to a method of forming intermediate low-pressure laminated ceramic devices.

Generally, laminated ceramic devices are formed using a plurality of the sheets (sometimes as many as fifty), which are stacked or positioned in overlying relationship. As understood in the art, the sheets are formed of unfired or green ceramic material which usually includes $Al_2O_3$ particles, glass particles, and a binder, generally including organic material. A plurality of module layers is defined on each sheet with each module layer on a sheet generally including some electrical traces, some electrical components such as capacitors, inductors, resistors, etc. During the stacking process, the sheets are vertically aligned to form common module sides through the entire stack (i.e. each module layer in a sheet overlies mating module layers in lower sheets). After the stacking and alignment of the sheets is accomplished, the stack is pressed under a uniaxial pressure at an elevated temperature to produce bonding between adjacent sheets. Generally, in the prior art the temperature is elevated to approximately 70° C. and a pressure of approximately 5000 pounds-per-square-inch (psi) is applied. As understood by those skilled in the art, the pressure and temperature must be sufficient to produce some bonding between the binders of adjacent sheets. Once the stack of unfired or green ceramic sheets has been bonded together, the stack is cut or otherwise divided into individual modules.

As stated above, one major problem that occurs with this prior art process of forming ceramic modules is the amount of pressure that must be applied to achieve adequate bonding of the unfired ceramic sheets. In many applications of ceramic modules it is desirable to incorporate channels for liquids and the like and/or internal or multilayer cavities. However, the high pressure required to produce the necessary bonding forces the sheet material into the voids producing deformations in these types of features. Also, the prior high pressure process is slow and cannot be easily implemented into an automated production line because the automated multilayer manufacturing stages are separated by the high-pressure lamination process, which is inherently a high labor technology.

In the present novel process, a plurality of layers of unfired ceramic material are provided. The layers may be blank or may already have been processed to include metal conductors, transmission lines, metal filled vias, etc. A polymer interfacial layer, having a glass transition temperature or modulus such that it becomes tacky or will flow at a temperature below a temperature required for the plurality of layers of unfired ceramic material to substantially deform, is deposited on one surface of each of the plurality of layers of unfired ceramic material. Generally, the polymer interfacial layer is deposited on the print side of each layer of the plurality of layers of unfired ceramic material. After application, the polymer interfacial layer forms a clear non-tacky, non-hydroscopic layer or surface. If the layers are blank, metal processing can be performed at this time. Alternatively, if the metal processing has been performed the laminating process can proceed directly.

In one embodiment, the polymer interfacial layer is in the form of a polymer solution so that a thin coating, e.g. generally in a range of approximately 500 to 1500 nm thick and preferably less than approximately 1200 nm thick, can be conveniently applied. While the liquid in the solution may be any convenient material, including a solvent, it will be understood that during the drying process the disposal of components of a solvent is more difficult. Also, volatile solvents other than water are often solvents for the polymer binder in the green ceramic sheets and thus if used could have a solvating effect on the surface of the green ceramic sheets which may introduce defects. Thus, in a preferred embodiment, the polymer is selected to be water soluble and with a glass transition temperature below approximately 90° C. In a specific example the polymer interfacial layer includes an aqueous solution of Poly(2-ethyl-2-oxazoline) having a glass transition temperature in a range of approximately 66° C. to approximately 72° C. In some other application methods, as will be described in more detail below, the polymer interfacial layer may be in the form of "hot-melt" or a tape transfer process.

The next step is to stack and align the plurality of layers of unfired ceramic material in overlying relationship with a polymer interfacial layer positioned between adjacent unfired ceramic layers in the stack. Here it will be understood that a polymer interfacial layer on the uppermost layer in a stack serves no useful purpose and may in fact be inconvenient in further processing steps. Thus, it may be convenient to provide an upper or final ceramic green layer which does not have a polymer interfacial layer thereon.

After the stack is properly aligned, it is heated to a temperature greater than the glass transition temperature of the polymer interfacial layer. Generally, this temperature is in a range of approximately 50° C. to approximately 80° C. While the stack is in the elevated temperature condition, pressure is applied to the heated stack below approximately 1200 psi to fixedly bond the plurality of layers in the stack together. It is believed that the application of sufficient bonding pressure produces hydrogen-bonding between the organic binder in the green ceramic layers and the interspersed polymer interfacial layers. To this end, it is preferred that the polymer in the polymer interfacial layer includes molecular-groups (either as side-chain units or within the main chain) that are capable of hydrogen bonding. Generally, the bonding pressure is in a range of approximately 500 psi to approximately 1200 psi.

After the stack of layers is properly bonded, i.e. intermediate laminated ceramic devices are formed, the stack is cut or otherwise divided into individual modules. The individual modules are then fired to sinter the ceramic (i.e. all of the organic material is burned off and the ceramic is fused into a continuous unit).

Figure 12:
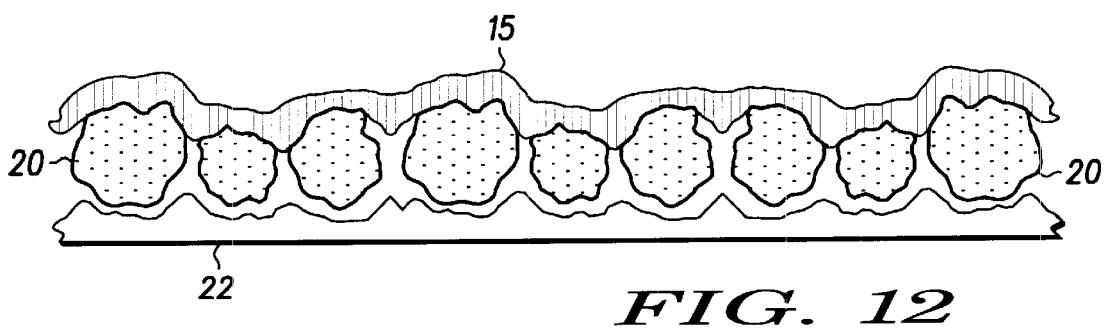
FIG. 12 illustrates a magnified portion of FIG. 1.

Referring to FIG. 1, a simplified view is illustrated of some exemplary steps in an assembly process performed in accordance with the present invention. In this example, a roll 10 of green (unfired) ceramic tape 11 is provided. A polymer interfacial layer 15 (see FIG. 12 for an example) is applied to the top surface (the print side) of ceramic tape 11, using an aqueous spray deposition 16. By spraying the aqueous solution in fine droplets, a more uniform layer or coating can be achieved. In this specific example, the polymer included in the aqueous solution is Poly(2-ethyl-2-oxazoline) having a glass transition temperature in a range of approximately 66° C. to approximately 72° C. It will of course be understood that alternative deposition techniques can be used as long as they allow the formation of polymer coatings in the 500 nm to 1500 nm thickness range.

In this preferred embodiment, a surfactant is added to the polymer aqueous solution to reduce the surface wetting-angle of the polymer aqueous solution on the initially ceramic-rich surface of the green ceramic tape 11. The type of surfactant and its concentration is dependent on the polymer used and its concentration. Surfactants useful in this process include ionic and nonionic type surfactants used in the concentration range 0.2–2 wt % of the polymer. Green tape 11 is heated to a temperature which is sufficient to supply adequate thermal energy to substantially instantaneously evaporate the carrier liquid (in this example water) as the solution is applied to the surface of green tape 11. It has been found that a temperature in the range of approximately 60° C. to 74° C. is adequate for this purpose. Lower temperatures do not generally provide rapid enough evaporation, and higher temperatures can cause distortion of the underlying Mylar substrate.

Figure 2:
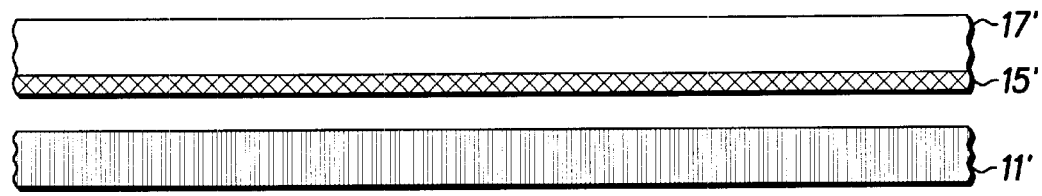
FIGS. 2, 3 and 4 are simplified sectional views of sequential steps in another process for applying an interfacial layer.
Figure 3:
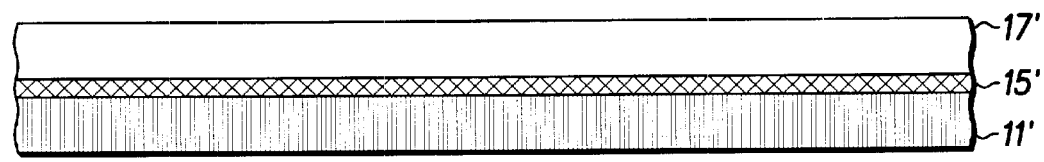
Figure 4:
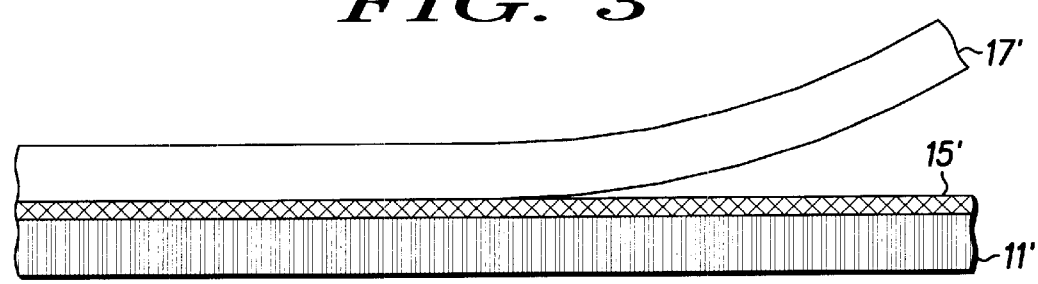

Turning to FIGS. 2–4, various steps in another method of applying a polymer interfacial layer, designated 15', are illustrated. In this method, polymer interfacial layer 15' is applied by a process commonly referred to as a "tape transfer" process. Poly(2-ethyl-2-oxazoline) transfer tape, generally designated 17' and including polymer interfacial layer 15' on a backing strip or tape 18', could be manufactured by methods well known in the art. The exposed surface of polymer interfacial layer 15' is applied to the top surface of a green ceramic sheet or tape 11' and heated above the glass transition temperature of the Poly(2-ethyl-2-oxazoline) under slight pressure (see FIG. 3), followed by removal of backing strip or tape 18' (see FIG. 4). The thickness of the Poly(2-ethyl-2-oxazoline) interfacial layer would be controlled during the manufacture of transfer tape 17'.

Figure 5:
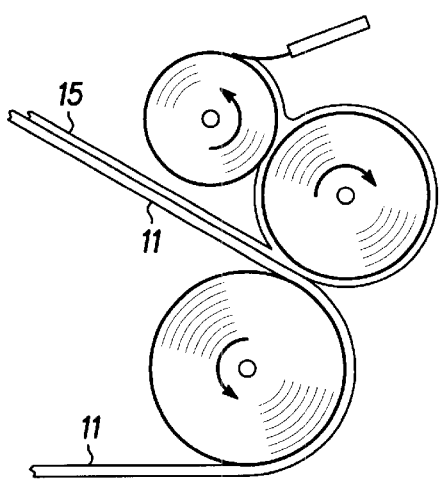
FIGS. 5, 6, and 7 are simplified views of other methods and equipment for applying an interfacial layer.
Figure 6:
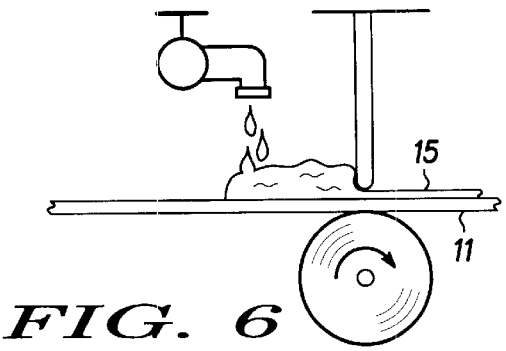
Figure 7:
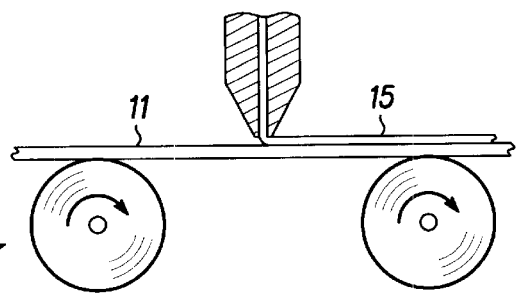

Poly(2-ethyl-2-oxazoline) is a thermoplastic polymer amenable to other application methods, such as "hot-melt" processing. The hot melt can be conveniently applied in a variety of processes including, for example, "hot-melt" roll coating or reverse-gravure coating as illustrated in FIG. 5. Alternative methods for applying the polymer in a molten state include gap-coat as illustrated in FIG. 6 and slot die as illustrated in FIG. 7. Other application methods may occur to those skilled in the art and it will be understood that the above application methods are for purposes of example only.

Figure 8:
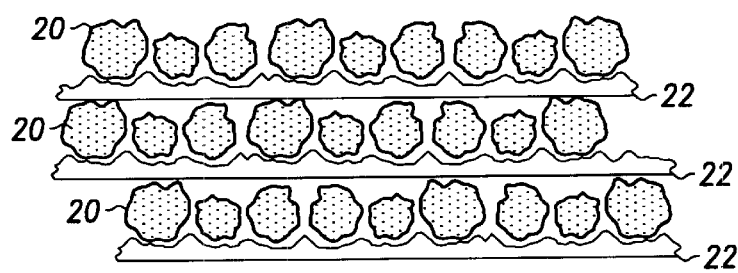
FIG. 8 is a simplified sectional view representative of a stack of green ceramic sheets prior to bonding in accordance with the present invention.
Figure 9:
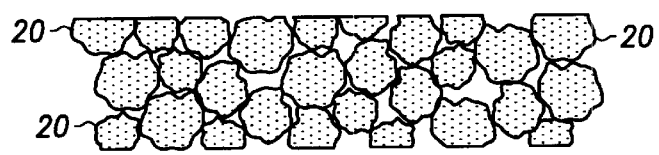
FIG. 9 is a simplified sectional view representative of a stack of green ceramic sheets subsequent to bonding in accordance with the present invention.

Turning to FIG. 8, a side view is illustrated of a plurality of green ceramic layers 20 with interspersed polymer interfacial layers 22. Here it can be seen that prior to bonding of layers 20 they are distinct separate layers. Referring additionally to FIG. 9, after the application of 1000 psi of pressure at an elevated temperature of 80° C., layers 20 become bonded in a substantially uniform body.

Specifically, there is adhesion of interspersed polymer interfacial layers 22 through hydrogen bonding at the ceramic interfaces. There is also mechanical adhesion through polymer binder-polymer interlayer shear mixing.

Figure 10:
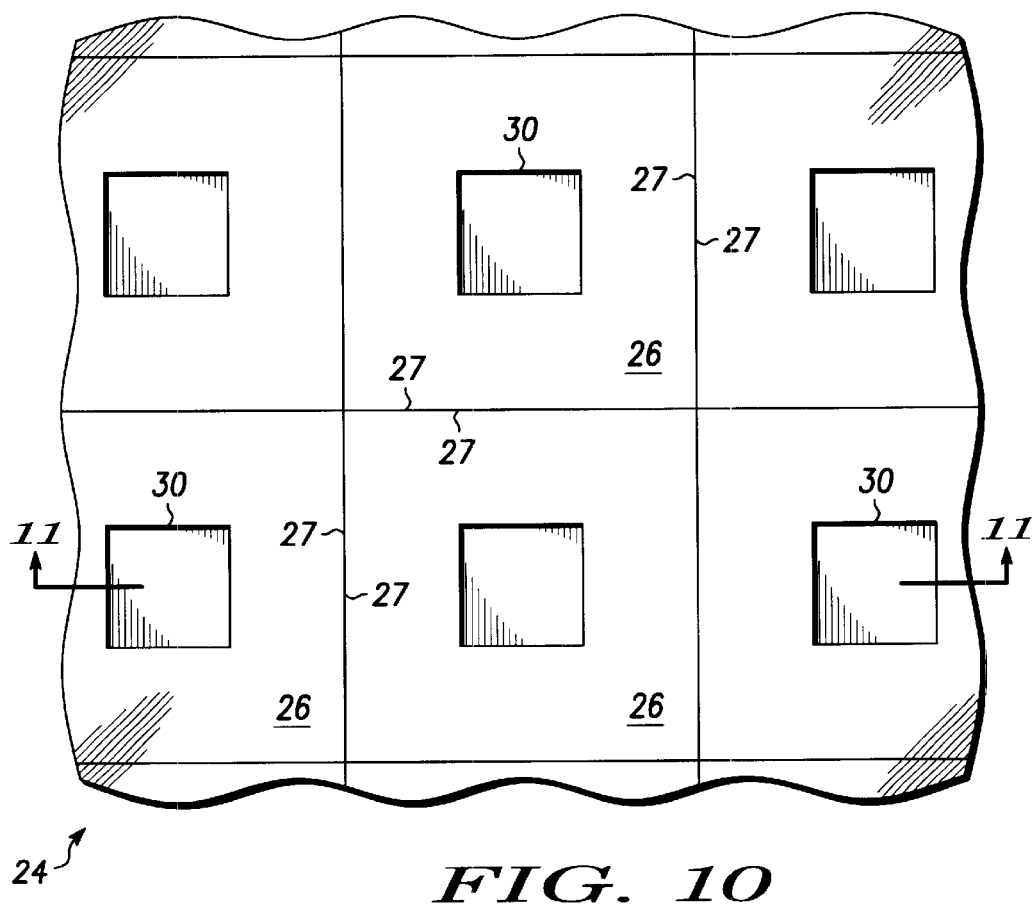
FIG. 10 is a view in top plan of a stack of green ceramic sheets illustrating typical cavities that can be formed in the stack in accordance with the present invention.
Figure 11:
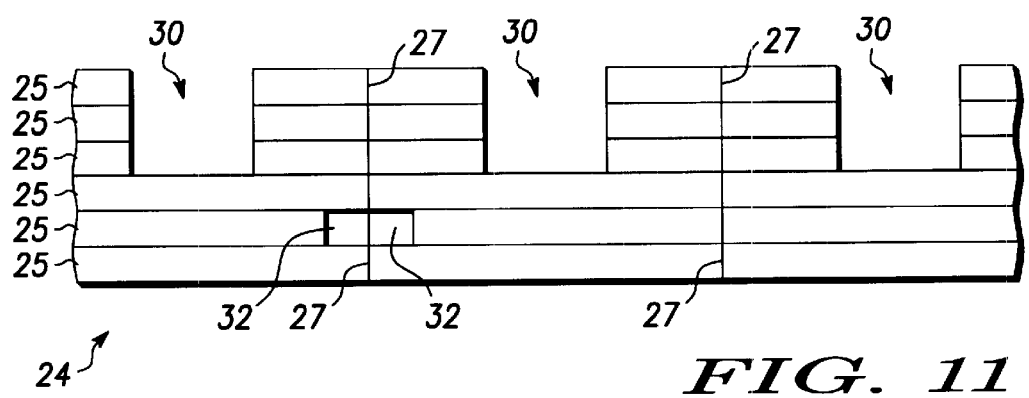
FIG. 11 is a sectional view as seen from the line 11–11 in FIG. 10.

Turning to FIG. 10, a view in top plan is illustrated of a stack 24 of green ceramic layers or sheets 25. Referring additionally to FIG. 11 a sectional view is illustrated of stack 25 showing sheets 26 in detail. Each sheet 25 includes a plurality of module components 26 defined by sides 27 and formed adjacent each other so as to share sides 27. Each component 26 may include some electrical traces, and may further include some electrical components such as capacitors, inductors, resistors, semiconductor integrated circuits, etc. Each component 26 also includes vias extending therethrough. The plurality of sheets 25 are stacked or positioned in overlying relationship with the sides 27 and any vias and components aligned to form one or more complete interconnected circuits.

As can be seen from FIG. 11, sheets 25 are stacked in overlying relationship with sides 27 aligned so as to form a plurality of vertically aligned modules. The modules are positioned in adjacent abutting relationship so as to share common sides 27 with the next adjacent module on each side. As is understood by those skilled in the art, sheets 25 are very thin and, generally, the total number of sheets used depends upon the circuit or circuits being integrated as well as any limitations on the height specified by a user of the module (e.g., 2 mm). Practically, the number of sheets included in stack 24 could vary from a minimum of two sheets 25 to as many as twenty total sheets, or more.

Once stack 24 of unfired or green ceramic sheets has been assembled as illustrated in FIGS. 10 and 11, the stack is cut or otherwise divided into individual modules. In this preferred embodiment stack 24 is cut with a very sharp instrument. The cutting is easily accomplished since sheets 25 are still formed of unfired or green ceramic. Once stack 24 is separated into individual modules, the modules are fired to cure the ceramic. As is understood in the art, the firing temperature is generally dictated by the composition of the green ceramic material. Generally, the green ceramic material includes $Al_2O_3$ particles, glass particles and an organic binder. In this case, the glass particles dictate the firing or sintering temperature, since the glass particles melt sufficiently to bind the aluminum particles together at a temperature of approximately 875° C. to leave a ceramic comprising $Al_2O_3$ particles bound together by at the least partially melted and reformed glass. Generally, the organic material is degraded during an earlier "binder removal" stage, typically 250° C. to 550° C., and 95% to 99% of the organic material has decomposed and left the body at the firing or sintering temperature. Also, the various sheets 25 are bound into a virtually single structure by the firing or sintering process. In the firing or sintering process the individual modules contract or shrink approximately 13%, but the shrinkage is substantially uniform so that it does not affect the final module.

In the specific example illustrated in FIGS. 10 and 11, a cavity 30 is defined in each of the modules by forming holes through each of the top three layers 25. When the layers 25 are properly aligned they define a cavity three layers deep. The cavity might be used, for example, to mount a semiconductor chip or other component. The upper surface of the fourth layer will have mounting pads and electrical connections for receiving the chip. Also, for purposes of this example, an internal channel 32 is defined in the second layer from the bottom of stack 24 (see FIG. 11). Channels such as channel 32 might be formed anywhere in the stack and could be incorporated for a multiplicity of purposes.

In the prior art, features such as cavities 30 and channels 32 could not be effectively incorporated into stacks of green ceramic sheets because such features would be deformed and, in some instances, completely closed by the pressures required to produce the necessary bonding. Utilizing the present novel low-pressure process to fabricate laminated ceramic devices, features such as cavities 30 and channels 32 can be conveniently and easily provided. Further, because there is little or no deformation during the laminating process and because the shrinkage during firing is known and uniform, features such as cavities 30 can be formed relatively accurately so that assembly of components therein requires little or no complex alignment.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of forming intermediate low-pressure laminated ceramic devices comprising the steps of:

providing a plurality of layers of unfired ceramic material each including ceramic particles in an organic binder;

depositing a polymer interfacial layer on one surface of each of the plurality of layers of unfired ceramic material, the polymer interfacial layer having a glass transition temperature such that the polymer interfacial layer flows at a temperature below a temperature required for the plurality of layers of unfired ceramic material to substantially deform;

stacking the plurality of layers of unfired ceramic material in overlying relationship to form a stack with a polymer interfacial layer positioned between adjacent unfired ceramic layers in the stack;

heating the stack to a temperature greater than the glass transition temperature of the polymer interfacial layer; and applying a pressure to the heated stack below approximately 1200 psi to fixedly bond the plurality of layers in the stack together.

2. A method as claimed in claim 1 wherein the step of depositing the polymer interfacial layer includes depositing the interfacial layer in the form of a polymer solution.

3. A method as claimed in claim 2 wherein the step of depositing the interfacial layer in the form of a polymer solution includes depositing an aqueous solution of Poly(2-ethyl-2-oxazoline).

4. A method as claimed in claim 3 wherein the step of depositing the aqueous solution of Poly(2-ethyl-2-oxazoline) includes depositing a coating less than approximately 1200 nm thick.

5. A method as claimed in claim 4 wherein the step of depositing the aqueous Solution of Poly(2-ethyl-2-oxazoline) includes spraying the aqueous solution in droplets.

6. A method as claimed in claim 4 wherein the step of depositing the aqueous solution of Poly(2-ethyl-2-oxazoline) includes adding a surfactant to the aqueous solution.

7. A method as claimed in claim 6 wherein the step of adding the surfactant to the aqueous solution includes adding one of an ionic and a non-ionic surfactant in a concentration range of approximately 0.2 to approximately 2 wt % of polymer in the aqueous solution.

8. A method as claimed in claim 1 wherein the step of depositing the polymer interfacial layer includes depositing the interfacial layer using a tape transfer process.

9. A method as claimed in claim 8 wherein the step of depositing the interfacial layer using the tape transfer process includes depositing a layer of Poly(2-ethyl-2-oxazoline).

10. A method as claimed in claim 9 wherein the step of depositing the layer of Poly(2-ethyl-2-oxazoline) includes the steps of providing a transfer tape including the layer of Poly(2-ethyl-2-oxazoline) and a backing layer, placing an exposed surface of the layer of Poly(2-ethyl-2-oxazoline) in contact with a surface of one of the layers of unfired ceramic material, applying pressure while heating to above 66° C., and removing the backing layer while leaving the layer of Poly(2-ethyl-2-oxazoline) attached to the surface of the one of the layers of unfired ceramic material.

11. A method as claimed in claim 1 wherein the step of depositing the polymer interfacial layer includes depositing the interfacial layer in a molten state.

12. A method as claimed in claim 1 wherein the step of depositing the polymer interfacial layer includes depositing the interfacial layer using hot-melt processing.

13. A method as claimed in claim 12 wherein the step of depositing the polymer interfacial layer includes depositing the interfacial layer using a hot-melt gap-coat process.

14. A method as claimed in claim 12 wherein the step of depositing the polymer interfacial layer includes depositing the interfacial layer using a hot-melt slot-die process.

15. A method as claimed in claim 12 wherein the step of depositing the polymer interfacial layer includes depositing the interfacial layer using a hot-melt reverse gravure-coat process.

16. A method as claimed in claim 1 wherein the step of heating the stack includes heating the stack to a temperature in a range of approximately 50° C. to approximately 80° C.

17. A method as claimed in claim 16 wherein the step of applying the pressure to the heated stack includes applying a pressure in a range of approximately 500 psi to approximately 1200 psi.

18. A method as claimed in claim 1 wherein the step of applying the pressure to the heated stack to fixedly bond the plurality of layers in the stack together includes applying sufficient pressure to produce hydrogen-bonding between the organic binder in the plurality of layers and the polymer interfacial layer.

19. A method of forming low-pressure laminated intermediate ceramic devices comprising the steps of:

providing a plurality of layers of unfired ceramic material each including ceramic particles in an organic binder;

depositing a polymer interfacial layer on one surface of each of the plurality of layers of unfired ceramic material, the polymer interfacial layer including an aqueous solution of Poly(2-ethyl-2-oxazoline) having a glass transition temperature in a range of approximately 50° C. to approximately 80° C.;

stacking the plurality of layers of unfired ceramic material in overlying relationship to form a stack with a polymer interfacial layer positioned between adjacent unfired ceramic layers in the stack;

heating the stack to a temperature greater than the glass transition temperature of the polymer interfacial layer; and applying a pressure to the heated stack in a range of approximately 500 psi to approximately 1200 psi to fixedly bond the plurality of layers in the stack together.

20. A method as claimed in claim 19 wherein the step of applying the pressure to the heated stack to fixedly bond the plurality of layers in the stack together includes applying sufficient pressure to produce hydrogen-bonding between the organic binder in the plurality of layers and the polymer interfacial layer.

21. A method as claimed in claim 19 wherein the step of depositing the aqueous solution of Poly(2-ethyl-2-oxazoline) includes depositing a coating less than approximately 1200 nm thick.

22. A method as claimed in claim 21 wherein the step of depositing the aqueous solution of Poly(2-ethyl-2-oxazoline) includes spraying the aqueous solution in droplets.

23. A method as claimed in claim 22 wherein the step of depositing the aqueous solution of Poly(2-ethyl-2-oxazoline) includes adding a surfactant to the aqueous solution.

24. A method as claimed in claim 23 wherein the step of adding the surfactant to the aqueous solution includes adding one of an ionic and a non-ionic surfactant in a concentration range of approximately 0.2 to approximately 2 wt % of polymer in the aqueous solution.

* * * * *